Figure 1:
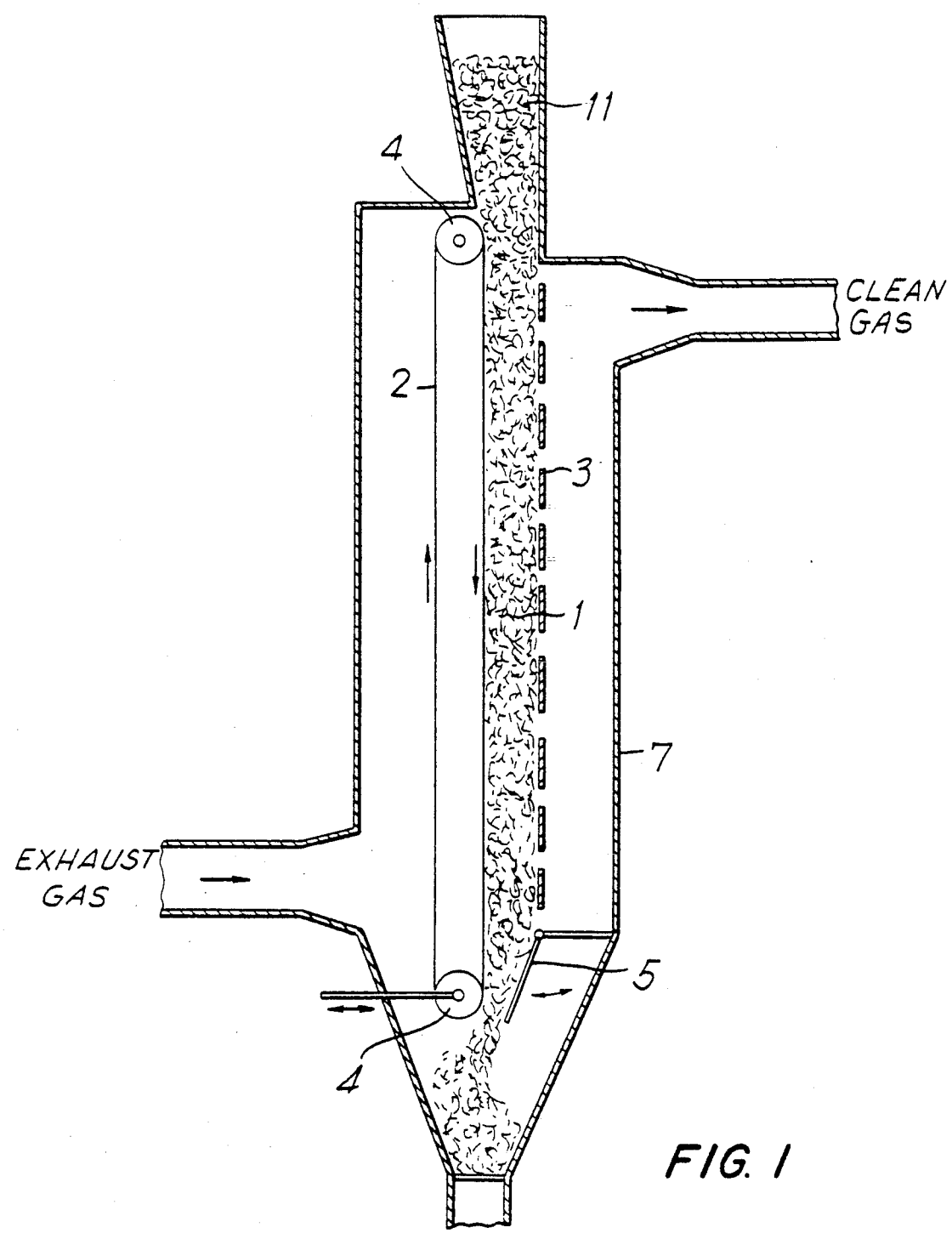

United States Patent [19]

Pieper

[11] Patent Number: 5,110,329
[45] Date of Patent: May 5, 1992

[54] FILTERING DEVICE FOR DUST AND EXHAUST GASES OF GLASS MELTING FURNACES CONTAINING SULFUROUS COMPOUNDS

[75] Inventor: Helmut Pieper, Lohr/Main, Fed. Rep. of Germany

[73] Assignee: Beteiligungen Sorg GmbH & Co. KG, Lohr/Main, Fed. Rep. of Germany

[21] Appl. No.: 540,936

[22] Filed: Jun. 20, 1990

[30] Foreign Application Priority Data

Jul. 1, 1989 [DE] Fed. Rep. of Germany ....... 3921720

[51] Int. Cl.$^5$ .............................................. B01D 46/32
[52] U.S. Cl. .......................................... 55/269; 55/73; 55/46; 55/351; 55/479; 55/527
[58] Field of Search .............. 55/73, 77, 79, 99, 269, 55/351, 479, 527, 181, 96, 97, 528

[56] References Cited

U.S. PATENT DOCUMENTS

| | | | |
|---|---|---|---|
| 3,405,508 | 10/1968 | Peters et al. | 55/23 |
| 4,083,701 | 4/1978 | Noack | 55/269 X |
| 4,927,435 | 5/1990 | Anson | 55/96 |
| 4,976,934 | 12/1990 | Maxinger et al. | 55/527 X |
| 4,983,193 | 1/1991 | Tani et al. | 55/527 X |

FOREIGN PATENT DOCUMENTS 0595049  3/1960  Canada ..................... 55/99

*Primary Examiner*—Charles Hart
*Attorney, Agent, or Firm*—Rosen, Dainow & Jacobs

[57] ABSTRACT

A filtering device for dust and exhaust gases of glass melting furnaces containing sulfurous compounds wherein the filtering medium is mineral wool which can be passed across the exhaust gas flow by means of a temperature-stable belt that matches the opening for the gas passage.

10 Claims, 5 Drawing Sheets

FILTERING DEVICE FOR DUST AND EXHAUST GASES OF GLASS MELTING FURNACES CONTAINING SULFUROUS COMPOUNDS

The invention concerns a filtering device for dust and exhaust gases of glass melting furnaces containing sulfurous compounds.

Presently known for dust separation in glass melting troughs are electrofilter and cloth filter. The use of both filtering techniques involves significant costs and also poses technical problems to a certain degree. One example in particular is the relatively narrow temperature range in which both filters operate. The electrofilter involves significant investment and operating costs and the cloth filter requires maintaining a very exact temperature. The temperature must be maintained since the filters are destroyed when the value falls below the condensation temperature or the filtering cloths, usually made of plastic, will burn away when a temperature at about 200° C. is exceeded. Cloth filters pose particular problems when used for exhaust gases with a high sulfate percentage since the oxidation of sodium sulfate into sodium bisulfate due to the $SO_3$ contained in the exhaust gas leads to especially fine dust. These dusts may cause a clogging of the filter.

As compared thereto, the invention aims at providing a filter which exactly matches the requirements of the glass industry, which is of a simple construction, and which operates largely independent from the exhaust gas temperatures after emerging from the glass trough. Moreover, the filtering medium should be made of a medium which can be reintroduced into the glass melt together with the dust thus allowing a complete removal with no residues left.

This object is accomplished in accordance with the invention in that filtering medium is a mineral wool which can be passed through the flow of exhaust gas by means of at least one temperature-stable conveyor belt matching the opening for the gas passage.

In accordance with the invention, an apparatus suitable for filtering dust and exhaust gases containing sulfur compounds emanating from a glass melting furnace comprises a housing having, a first and second end, a first belt within the housing extending from the first end to the second end, a perforated means within the housing extending from the first end to the second end and substantially parallel to the first belt, and a filter means located between the first belt and perforated means. The filter means moves between the first end and second end substantially independently of the first belt.

The subclaims 2 to 10 describe advantageous embodiments in further detail.

Since there are no non-gaseous substances left after the reintroduction of the filtering medium into the glass melting furnace i.e. this is a complete removal without residues, the simplicity of the subject-matter of the invention suggests an ideal solution to the problems.

The following drawings explain embodiments of the invention in further detail. Referring now to the figs.

Figure 2:
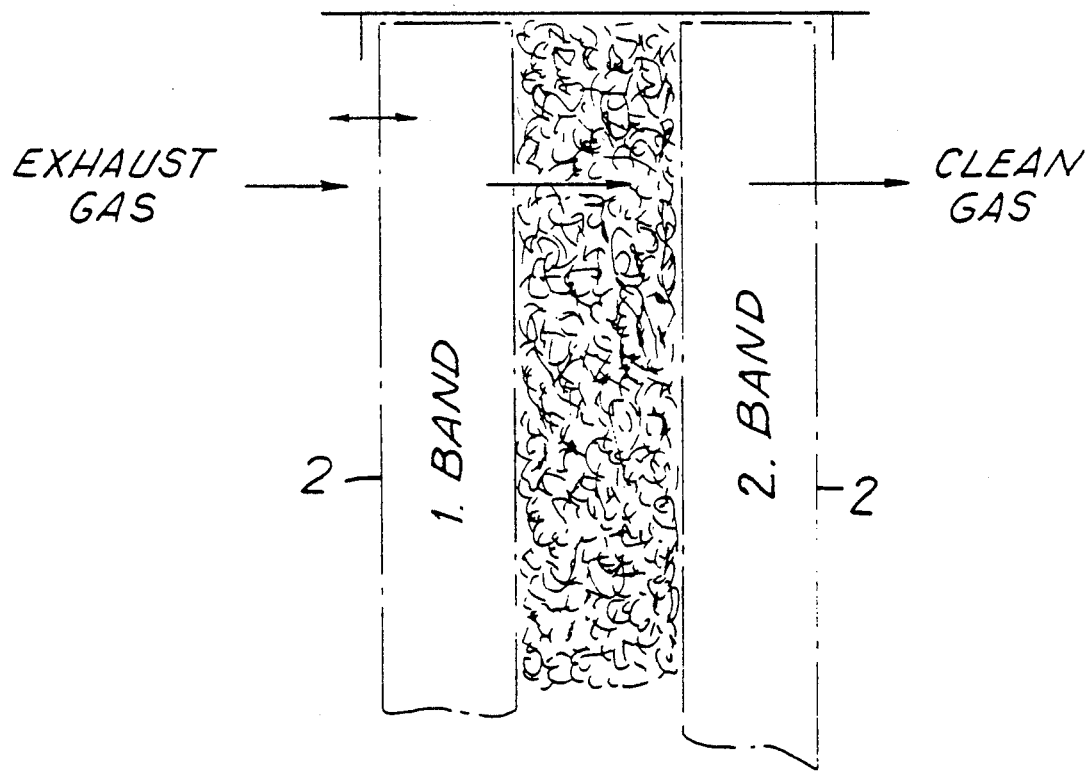
Figure 3:
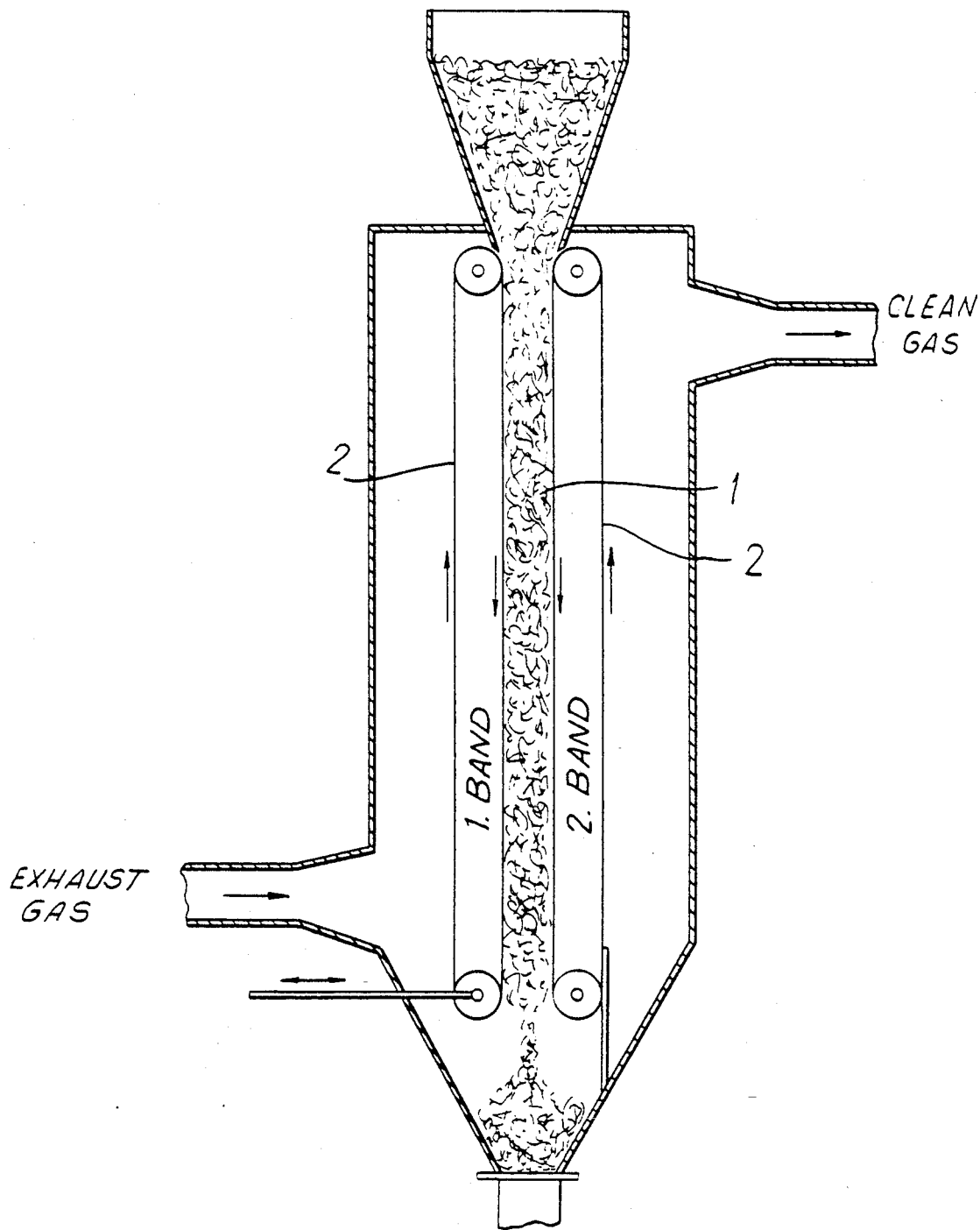
Figure 4:
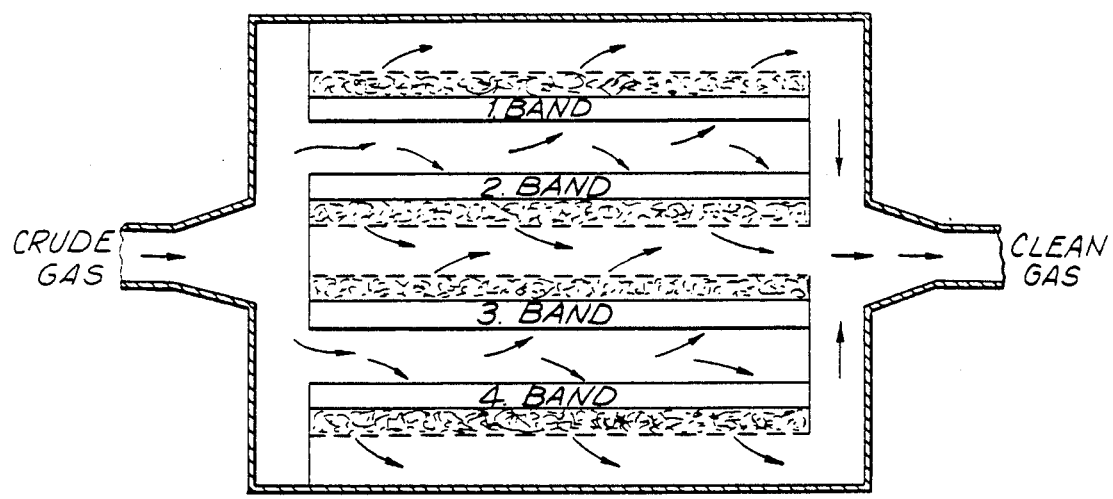
Figure 5:
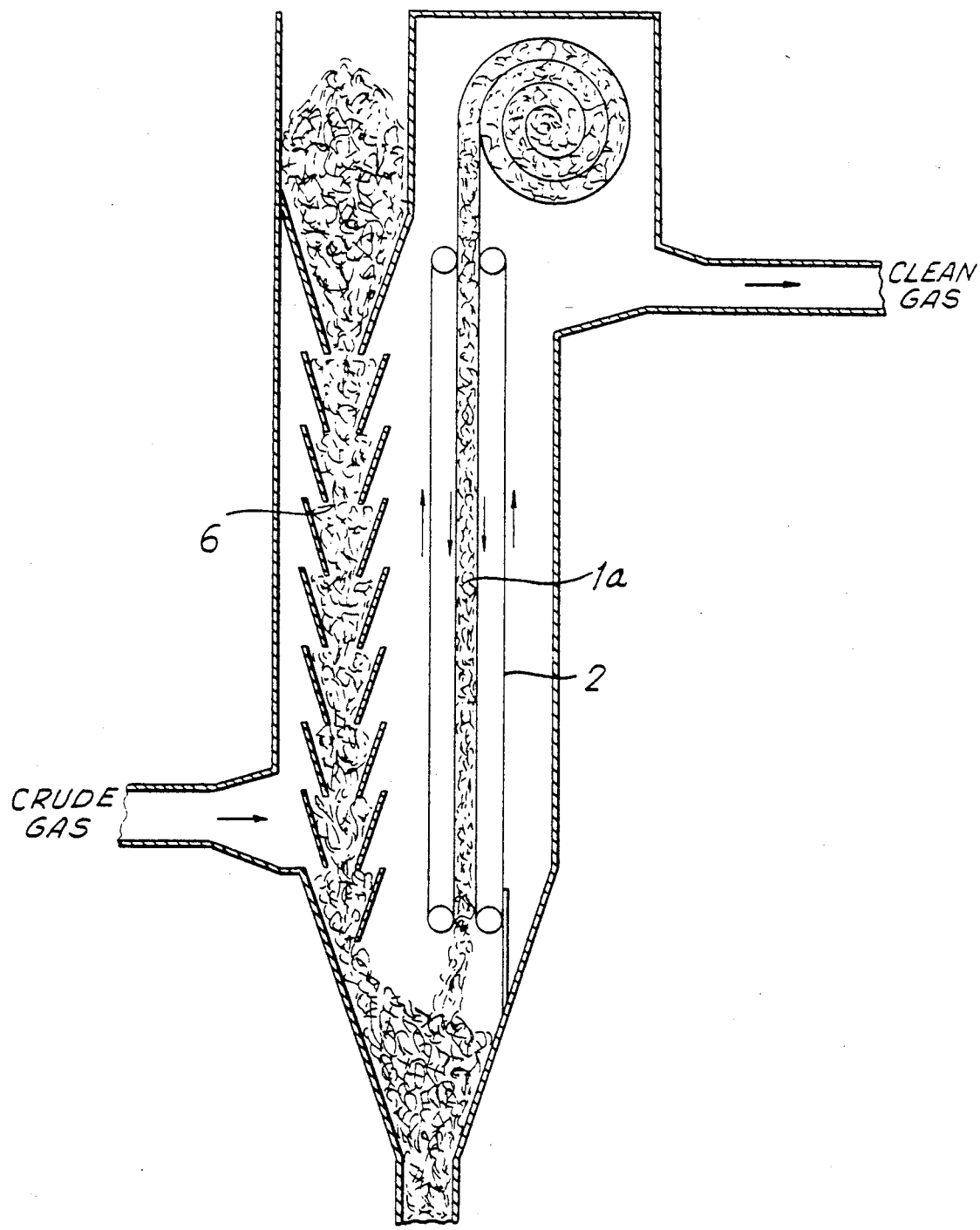

FIG. 1 is a diagrammatical representation of a cross section of one embodiment of the invention, FIG. 2 is a top view of an embodiment having two belts, FIG. 3 is a vertical cross section of the embodiment of FIG. 2, FIG. 4 is a top view of a several juxtaposed, series-connected filters and FIG. 5 is a vertical cross section of a filter where the filtering material is employed in the form of battings and where the batch is upstream in flow direction and/or with cullet preheating.

In FIG. 1, loose glass wool or rock wool 1 or a quilted belt of glass wool or rock wool 1 is incorporated between two continuous belts or between a belt 2 and a perforated wall or a perforated plate 3 is a vertically standing steel case or housing 7 of corresponding dimensions. The steel belt 2 is made of wire mesh as used in the glass industry for cooling furnaces for temperatures up to 700° C.

FIG. 1 shows such a system including a belt 2 and a perforated rear wall 3. In the upper part of the system, the glass wool 1 is inserted in a storage container 11 which is then closed to avoid the entry of additional air. The moving belt 2 transports the glass wool downwardly. The width of the transported layer can be determined by a movable flap 5 in the lower part. This flap 5 is mounted such that the larger portion of the transport covers the one layer which is close to the belt 2 because this is the layer which is mostly contaminated with dust. The position of flap 5 now permits determining the width of the dust-laden layer to be discharged.

In order to avoid open caverns in the wool 1 allowing unfiltered gas to pass, the freely suspended lower guiding roller 4 of the belt can be horizontally adjusted such that the wool 1 between the belt 2 and the perforated steel wall 3 can be more or less compressed. This compression of the wool also ensures a sealing on the side with respect to container 11. The pressure of the belt presses the wool 1 against the side wall of container 7 such that it is sealed. Moreover, on their sides, the belts of FIG. 2 can have a labyrinth seal.

FIG. 3 shows an embodiment having two belts 2 which can operate at different speeds such that the part facing the crude gas side is discharged faster. The speed of the belts 2 and, hence, the throughput of wool 1 or filtering medium can be controlled in the system in dependence upon the pressure loss. The more dust is contained in the wool 1, the higher is the pressure loss, i.e. the pressure lose decreases again with an increasing belt speed. This filter can thus always operate at exactly the same pressure loss and, hence, the same rate of separation.

The fact that the filter constantly renews itself permits filtering surfaces substantially smaller than those of cloth filters which require a very large filtering surface since the latter is covered with a dust layer.

In order to accommodate a large filtering surface on a relatively small area, which may sometimes be required, the belt arrangement and, hence, the exhaust routes of FIG. 4 can be connected in parallel.

Instead of the loose wool 1, it is also possible to use quilted battings 1a on rollers. Advantageously, the yarn to quilt the battings 1 is made of a plastic which burns away at 160° C., at the latest. The use of quilted material ensures that the material thickness of the filter is always constant. Since the quilted threads burn away at the filter outlet, the batting becomes loose and the loose wool can be easily discharged.

It is advantageous to combine this kind of filter with a known cullet preheater 6 in which the temperature of the exhaust gases and hence the volume of the gases is significantly reduced thus increasing the rate of separation. Moreover, calcium hydroxide can be added to the cullet such that the gaseous $SO_2$ reacts with the calcium hydroxide to form calcium sulfate which in turn can be easily separated in a downstream filter. It is obvious that filters of the kind in accordance with the invention, in case glass wool is used, can operate at temperatures of 500°–600° C. and, in case rock wool is used, at temperatures up to 700° C. The filter is thus mostly independent from the exhaust gas temperature of the melting furnace.

Since the filtering material is glass, there are no objections to reintroduce this glass into the trough together with the cullet or other raw material. The use of rock wool is limited to color glass troughs. This allows an absolutely safe and residue-free removal of the filtering dust.

I claim:

1. An apparatus suitable for filtering dust and exhaust gases containing sulfur compounds emanating from a glass melting furnace comprising a housing having:
   a first and second end;
   a first belt within said housing extending from said first end to said second end;
   perforated means within said housing extending from said first end to said second end and positioned substantially parallel to said belt; and
   filter means located between said first belt and perforated means,
   said filter means moving between said first and second end substantially independently of said first belt.

2. The apparatus according to claim 1, wherein said first belt comprises wire mesh.

3. The apparatus according to claim 1, wherein said perforated means comprises a perforated plate for allowing gas to pass through.

4. The apparatus according to claim 1, wherein said perforated means comprises a second belt for allowing gas to pass through.

5. The apparatus according to claim 4, wherein said second belt is driven independently from said first belt.

6. The apparatus according to claim 1, wherein said filter means comprises mineral wool in the form of battings.

7. The apparatus according to claim 6, wherein said mineral wool being quilted with threads that disintegrate by burning with increasing temperature.

8. The apparatus according to claim 1, wherein said housing further comprises a controllable flap located at said second end and attached to said perforated means for controlling the amount of filter means permitted to pass through said second end of said housing.

9. The invention according to claim 1, wherein said first belt is guided by a labyrinth seal.

10. The apparatus according to claim 1, wherein the housing further comprises a plurality of belts, a plurality perforated means, and a plurality of filter means between said plurality of belts and plurality of perforated means, respectfully said plurality of filter means moving substantially independently of said plurality of belts.

* * * * *